US012749104B2

(12) United States Patent

Subramanya et al.

(10) Patent No.: US 12,749,104 B2

(45) Date of Patent: Sep. 29, 2026

(54) MULTI-FACET ACTIONS FOR IMPROVED CONVERSATIONAL ITEM SEARCH REFINEMENT

(71) Applicant: Walmart Apollo, LLC, Bentonville, AR (US)

(72) Inventors: Raghavendra Subramanya, Frisco, TX (US); Praneeth Gubbala, Milpitas, CA (US); Xuan Zhang, Georgetown, TX (US); Shilpa Gopinath, Kerala (IN); Kamalpreet Singh, Dallas, TX (US); Dong Nguyen, Wylie, TX (US); Harish Bondalapati, Bentonville, AR (US); Bahula Bosetti, Bentonville, AR (US); Sneha Oladhri, Irving, TX (US); Nishant Kumar Mishra, Pradesh (IN); Lakshya Khandelwal, Kota Rajasthan (IN); Navesh Garg, Bangalore (IN)

(73) Assignee: Walmart Apollo, LLC, Bentonville, AR (US)

( * ) Notice: Subject to any disclaimer, the term of this patent is extended or adjusted under 35 U.S.C. 154(b) by 154 days.

(21) Appl. No.: 18/392,700

(22) Filed: Dec. 21, 2023

(65) Prior Publication Data

US 2025/0209510 A1 Jun. 26, 2025

(51) Int. Cl.

*G06F 40/284* (2020.01)
*G06F 40/40* (2020.01)

(Continued)

(52) U.S. Cl.

CPC ....... *G06Q 30/0627* (2013.01); *G06F 40/284* (2020.01); *G06F 40/40* (2020.01)

(58) Field of Classification Search

CPC .... G06F 16/242; G06F 16/332; G06F 16/335; G06F 16/9035; G06F 40/279;

(Continued)

(56) References Cited

U.S. PATENT DOCUMENTS 8,838,583 B1 * 9/2014 Fox .................... G06Q 30/0207 707/723
9,348,892 B2 5/2016 Jain et al.

(Continued)

OTHER PUBLICATIONS

Devlin et al., "BERT: Pre-Training of Deep Bidirectional Transformers for Language Understanding", Proceedings of the 2019 Conference of the North American Chapter of the Association for Computational Linguistics: Human Language Technologies, vol. 1, Jun. 2-9, 2019, pp. 4171-4186. (Year: 2019).*

(Continued)

*Primary Examiner* — Martin Lerner

(74) *Attorney, Agent, or Firm* — Foley IP Law, PLLC

(57) ABSTRACT

Examples provide conversational item search refinement using multi-facet filtering of items in a catalog. A multi-facet filter manager extracts facets and actions corresponding to the facets from a user utterance. The facet-actions include an entity-role and one or more filter actions associated with the facets. A facet-action includes filter actions such as exact, exclude, greater than, less than, etc. Multi-facet filters corresponding to the facet-actions are applied to a plurality of items in the catalog. The candidate items remaining after filtering are scored. The scores indicate relevance of each candidate item. One or more of the candidate items with the highest scores are selected. The selected items are added to search results which are returned to the user in response to the conversational search query. The multi-facet filter manager enables faster and more accurate search results using fewer conversational turns for reduced system resource usage and improved user efficiency.

20 Claims, 11 Drawing Sheets

(51) Int. Cl.
*G06N 3/0455* (2023.01)
*G06Q 30/0601* (2023.01)

(58) Field of Classification Search
CPC ..... G06F 40/284; G06F 40/30; G06N 3/0455; G06N 3/045; G06Q 30/0625; G06Q 30/0627
USPC ........... 704/1, 9, 270; 706/12; 707/723, 728, 707/731, 754; 705/26.1, 26.63
See application file for complete search history.

(56) References Cited

U.S. PATENT DOCUMENTS

| | | | | |
|---|---|---|---|---|
| 9,842,162 | B1 * | 12/2017 | Hotchkies | G06F 16/30 |
| 10,235,449 | B1 * | 3/2019 | Viswanathan | G06F 40/117 |
| 10,776,408 | B2 | 9/2020 | Altaf et al. | |
| 11,854,544 | B1 * | 12/2023 | Weiss | G10L 15/183 |
| 11,880,411 | B2 * | 1/2024 | Cheng | G06F 40/295 |
| 12,100,387 | B2 * | 9/2024 | Gubbala | G06Q 30/0633 |
| 2016/0063993 | A1 * | 3/2016 | Dolan | G06F 40/279 704/254 |
| 2017/0124619 | A1 * | 5/2017 | Abhishek | G06Q 30/0629 |
| 2017/0148078 | A1 * | 5/2017 | Agarwal | G06F 16/9535 |
| 2017/0221120 | A1 * | 8/2017 | Pathak | G06Q 30/0643 |
| 2019/0066185 | A1 * | 2/2019 | More | G06Q 30/0627 |
| 2019/0205444 | A1 | 7/2019 | Yazdani et al. | |
| 2019/0205445 | A1 * | 7/2019 | Yazdani | G06F 16/951 |
| 2019/0311210 | A1 * | 10/2019 | Chatterjee | G06F 40/279 |
| 2019/0361982 | A1 * | 11/2019 | Jacobson | G06F 16/686 |
| 2020/0233873 | A1 * | 7/2020 | Kamotsky | G06N 3/09 |
| 2022/0129449 | A1 * | 4/2022 | Springer | G06F 16/2468 |
| 2022/0156823 | A1 | 5/2022 | Tremblay et al. | |
| 2022/0172269 | A1 * | 6/2022 | Shan | G06N 3/049 |
| 2022/0197900 | A1 * | 6/2022 | Maheshwari | G06N 3/09 |
| 2022/0300560 | A1 * | 9/2022 | Filice | G10L 15/22 |
| 2023/0245193 | A1 * | 8/2023 | Wang | G06Q 30/0623 |
| 2023/0343326 | A1 * | 10/2023 | Gubbala | G06F 40/295 |
| 2024/0029132 | A1 * | 1/2024 | Lin | G06F 40/284 |
| 2024/0078583 | A1 * | 3/2024 | Oribio | G06Q 30/0627 |

OTHER PUBLICATIONS

Masoumzadeh, Ph, Seyed Saeid "Combining Filtering and Full-Text Search Using Named Entity Recognition", https://medium.com/@masoumzadeh/combining-filtering-and-full-text-search-using-named-entity-recognition-91867a9316e5, 2023, 10 pages.

* cited by examiner

900

| Enities | Precision | Recall | F1 |
|---|---|---|---|
| Product | 98.1 | 97.7 | 97.9 |
| Brand | 96.5 | 98.1 | 97.3 |
| Color | 96.1 | 97.5 | 96.8 |
| Discount | 99.2 | 99.6 | 99.4 |
| Material | 97.8 | 98.5 | 98.2 |
| Price | 99.7 | 99.7 | 99.7 |
| Review Rating | 99.8 | 98.3 | 99.0 |

*FIG. 9*

1000

| Refinement Types | Precision | Recall | F1 |
|---|---|---|---|
| GREATER | 99.5 | 98.6 | 99.1 |
| EXCLUDE | 1 | 99.21 | 99.6 |
| START | 1 | 98.85 | 99.42 |
| END | 98.83 | 1 | 99.41 |
| LESSER | 99.4 | 99 | 99.2 |

*FIG. 10*

MULTI-FACET ACTIONS FOR IMPROVED CONVERSATIONAL ITEM SEARCH REFINEMENT

BACKGROUND

Natural language search queries enable a user to input a product search request using questions framed in natural conversational statements that identify a desired item (product) and search terms identifying a facet (attributes) of the desired item. This information can be parsed from the conversational statements using natural language processing (NLP) systems. However, current systems are frequently limited to queries having a single facet and/or a single filter action. This forces users to provide numerous separate queries through numerous conversational turns to eventually obtain a desired search result. This is inefficient and time-consuming for the user. Moreover, many systems are limited in the types of facets and filter actions which the system is capable of recognizing and applying. This results in sub-optimal search results which are frequently inaccurate and/or incomplete.

SUMMARY

Some examples provide a system and method for more accurate and relevant conversational item search results using multi-facet actions. In some embodiments, a multi-facet filter manager obtains a single utterance of a user comprising a conversational search query. The conversational search query includes a plurality of words identifying an item and a plurality of search refinement terms associated with the item. The multi-facet filter manager extracts a plurality of facet-actions corresponding to the plurality of search refinement terms from the plurality of words. A facet includes an item attribute. A facet-action includes a set of one or more filter actions corresponding to the item attribute. The multi-facet filter manager applies a plurality of multi-facet filters to a plurality of items in a catalog. The plurality of multi-facet filters corresponds to the plurality of facet-actions. The items remaining after application of the plurality of multi-facet filters are candidate items. The multi-facet filter manager scores the plurality of candidate items using a set of scoring criteria. Scoring the candidate items includes generating an item relevance score for each candidate item. The multi-facet filter manager selects one or more candidate items from the plurality of candidate items having the highest scores indicating the item is more relevant as a search result than other lower scoring candidate items. The multi-facet filter manager generates a search result including the selected candidate item. The search result is presented to the user via a user interface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 9 is an exemplary table of entities associated with facets extracted from utterances by a multi-facet filter manager.

FIG. 10 is an exemplary table of filter actions associated with facet-actions.

Corresponding reference characters indicate corresponding parts throughout the drawings.

DETAILED DESCRIPTION

Figure 1:
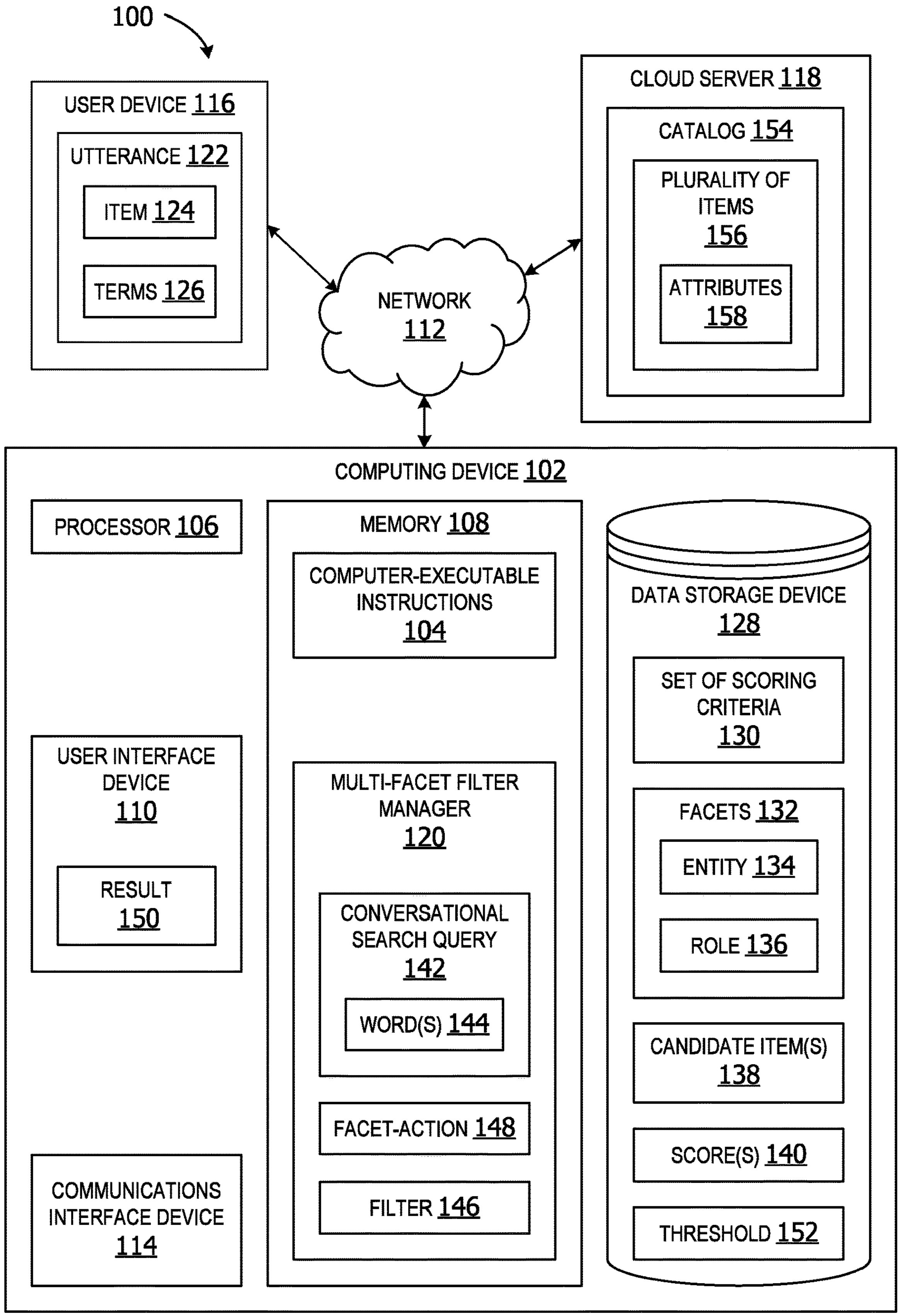
FIG. 1 is an exemplary block diagram illustrating a multi-facet filter system for improved conversational item search refinement using multi-facet actions obtained from a single utterance.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

As the next generation in user interaction approach, conversational artificial technology (AI) technology, such as chatbots, is penetrating many applications on cell phones, smart watches, smart speakers, TVs, computers, etc. Conversational artificial intelligence (AI) technology is helping people in diverse situations, such as automated call centers, digital assistants, and online retail. Conversational shopping is one of the important attempts to deliver an improved online shopping experience to users, which also faces significant technical challenges.

In the online retail area, conversational product search (CPS) assists users in locating desired items in an online catalog of items (products) where the user can type their search queries through texting or entering search phrases in a search field. CPS can also provide verbal search requests through human speech (talking), as if the user were shopping with a real store associate. The search refinement in CPS is based on the dialog itself. However, most CPS systems can only handle search refinement by a single item facet. A facet is an attribute of an item, such as, for example, brand, price, item review rating, discounts, etc. It can be challenging due to the presence of diverse item facets and the difficulty in identifying appropriate filter actions when multiple facets are present in a refinement query.

In addition, when multiple product facets are present, different refinement types are needed to identify, filter, and coordinate the logical relationships between different items and item facets. Some CPS systems can help customers perform multiple-rounds of search refinement using multiple refining search queries, but have limits in dealing with multiple product facets given in a single utterance, which increases the number of undesirable items returned to the user and increases the number of conversations turns necessary if the users want to refine the search results with multiple facets. Moreover, in many CPS systems, unordered entities like brand, material, and color are unavailable for search refinement, where refinement actions like "exact" and/or "exclude" are the only actions applicable.

To close this gap with existing approaches, the embodiments provide a multi-facet filter system including a language model to identify item facets and aspect-oriented entity role(s) to identify facet-actions. A facet-action is a filter-related action applied to remove irrelevant items during a search, such as, but not limited to, an exact action which exactly matches an item or item type, a greater than action, less than (lesser) action, a range, an exclude action, etc.

Referring to the figures, examples of the disclosure enable a multi-facet filter manager for improved conversational item search refinement. In some examples, the multi-facet filter manager extracts multiple facets and multiple facet-actions from a single user utterance. The utterance includes a verbal utterance or written (text) utterance including an identification of an item and multiple search refinement terms. This enables the system to handle complex search queries with a single conversational turn (single sentence utterance) rather than requiring a separate conversational turn for each different search refinement term. This enables faster and more efficient natural language searches while reducing system processor usage and network bandwidth usage due to the fewer number of conversational turns.

In other embodiments, the system provides a plurality of multi-facet filters corresponding to multiple facet-actions extracted from a single utterance. The multi-facet filters are applied to items in a catalog to filter for candidate items which are most relevant to the search conversational search query while minimizing processor and memory usage, as fewer conversational turns are required to filter for all search refinement terms desired by the user. This results in reduced system resource usage and improved accuracy and efficiency generating search results.

The system, in some embodiments, recognizes multiple facet actions in a product search query. This enables the system to generate search results that are more accurate and further reduces the number of user actions while engaged in an online search.

The computing device is used in an unconventional manner by extracting multiple facets and facet-actions from a single utterance which is used to apply multi-facet filters to items in a catalog of items. In this manner, the computing device is used in an unconventional way, and allows more accurate and relevant conversation item search refinement while reducing overall system resource usage, thereby improving the functioning of the underlying computing device.

In still other embodiments, the search results generated via the multi-facet filter manager are generated and presented to a user for viewing via a user interface (UI) device. The search results include the highest scoring candidate items having the most relevance in view of the user's search query identified using fewer conversational turns. This enables increased speed in obtaining accurate search results, improved accuracy of search results requiring fewer additional search refinements, improved user efficiency via the UI, as well as improved user interaction performance.

Referring again to FIG. 1, an exemplary block diagram illustrates a multi-facet filter system 100 for improved conversational item search refinement using multi-facet actions obtained from a single utterance. In the example of FIG. 1, the computing device 102 represents any device executing computer-executable instructions 104 (e.g., as application programs, operating system functionality, or both) to implement the operations and functionality associated with the computing device 102. The computing device 102, in some examples includes a mobile computing device or any other portable device. A mobile computing device includes, for example but without limitation, a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 has at least one processor 106 and a memory 108. The computing device 102, in other examples includes a user interface device 110.

The processor 106 includes any quantity of processing units and is programmed to execute the computer-executable instructions 104. The computer-executable instructions 104 is performed by the processor 106, performed by multiple processors within the computing device 102 or performed by a processor external to the computing device 102. In some examples, the processor 106 is programmed to execute instructions such as those illustrated in the figures (e.g., FIG. 5, FIG. 6, FIG. 7, and FIG. 8).

The computing device 102 further has one or more computer-readable media such as the memory 108. The memory 108 includes any quantity of media associated with or accessible by the computing device 102. The memory 108 in these examples is internal to the computing device 102 (as shown in FIG. 1). In other examples, the memory 108 is external to the computing device (not shown) or both (not shown). The memory 108 can include read-only memory and/or memory wired into an analog computing device.

The memory 108 stores data, such as one or more applications. The applications, when executed by the processor 106, operate to perform functionality on the computing device 102. The applications can communicate with counterpart applications or services such as web services accessible via a network 112. In an example, the applications represent downloaded client-side applications that correspond to server-side services executing in a cloud.

In other examples, the user interface device 110 includes a graphics card for displaying data to the user and receiving data from the user. The user interface device 110 can also include computer-executable instructions (e.g., a driver) for operating the graphics card. Further, the user interface device 110 can include a display (e.g., a touch screen display or natural user interface) and/or computer-executable instructions (e.g., a driver) for operating the display. The user interface device 110 can also include one or more of the following to provide data to the user or receive data from the user: speakers, a sound card, a camera, a microphone, a vibration motor, one or more accelerometers, a BLUETOOTH® brand communication module, wireless broadband communication (LTE) module, global positioning system (GPS) hardware, and a photoreceptive light sensor. In a non-limiting example, the user inputs commands or manipulates data by moving the computing device 102 in one or more ways.

The network 112 is implemented by one or more physical network components, such as, but without limitation, routers, switches, network interface cards (NICs), and other network devices. The network 112 is any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN, such as an intranet.

In some examples, the system 100 optionally includes a communications interface device 114. The communications interface device 114 includes a network interface card and/or computer-executable instructions (e.g., a driver) for operating the network interface card. Communication between the computing device 102 and other devices, such as but not limited to a user device 116 and/or a cloud server 118, can occur using any protocol or mechanism over any wired or wireless connection. In some examples, the communications interface device 114 is operable with short range communication technologies such as by using near-field communication (NFC) tags.

The user device 116 represents any device executing computer-executable instructions. The user device 116 can be implemented as a mobile computing device, such as, but not limited to, a wearable computing device, a mobile telephone, laptop, tablet, computing pad, netbook, gaming device, and/or any other portable device. The user device 116 includes at least one processor and a memory. The user device 116 can also include a user interface device. In this example, a user provides a natural language search query in the form of an utterance 122.

The utterance is a conversational search query 142 provided as a verbal utterance or a written utterance in text form. The utterance 122 includes one or more word(s) 144 identifying an item 124 and search refinement terms 126. A search restriction term is a term intended to restrict search results based on one or more item attributes. An attribute is a characteristic or feature of an item, such as, for example, a color, size, brand, price, etc.

The utterance 122 is provided via an application or other software component on the user device 116. The utterance 122 is transmitted to the computing device 102 and/or the cloud server 118 via the network for utilization by the multi-facet filter manager 120.

The cloud server 118 is a logical server providing services to the computing device 102 or other clients, such as, but not limited to, the user device 116. The cloud server 118 is hosted and/or delivered via the network 112. In some non-limiting examples, the cloud server 118 is associated with one or more physical servers in one or more data centers. In other examples, the cloud server 118 is associated with a distributed network of servers.

In this example, the cloud server 118 is associated with a merchant system hosting a plurality of items 156 in a catalog 154 of items. Each item in the catalog 154 is associated with one or more attributes 158 provided in a description of each item in the catalog 154. In this embodiment, the catalog 154 is stored in a database on the cloud server 118. In this example, the multi-facet filter manager 120 obtains data from the catalog 154 via the network 112. However, in other embodiments, the catalog 154 is stored in a database on the data storage device 128 on the computing device 102.

The system 100 can optionally include a data storage device 128 for storing data, such as, but not limited to a set of one or more scoring criteria, item facets 132, candidate item(s) 138 and/or score(s) calculated for the candidate item(s) 138. The set of scoring criteria 130 includes criteria such as scoring metrics, scoring formulas for calculating a score, weighting for scores, etc.

The facets 132 include attributes of items extracted from the utterance 122. A facet 132 includes at least one entity 134 and at least one role 136. An entity is an attribute of a desired item described in a conversational search query 142 provided in the utterance. The role, in this example, is the value associated with the entity. For example, if a search restriction provided in the utterance states "shirts with a price less than fifty dollars," the item is a shirt, the entity 134 is price, and the role 136 is fifty dollars.

The candidate item(s) 138 includes items from the plurality of items 156 remaining after the multi-facet filter manager 120 applies multi-facet filters 146 corresponding to one or more facet-actions 148 to remove items from the plurality of items 156 which are not responsive to the conversational search query 142 associated with the utterance 122. The facet-actions 148 includes search refinement actions such as, but not limited to, "exact", "equals", "range", "greater", "lesser" and/or "exclude."

An "Exact" match indicates that the user intends to retrieve an item having an attribute that is an exact match. An exact match refers to an "equals" operation on the item facet (attribute) description. For example, if the user utterance states, "Show me only Nike blue t-shirts" where the brand and color entity are specified. The facet-action "range" includes a range of facet-role values. For example, if the user utterance includes the words "Show me men's t-shirts with prices between $20 and $50," the user wants items having a price that is within the range from 20 to 50 dollars. The facet-action "greater" refers to filtering for values that are greater than the stated value in the search request. The facet-action "lesser" refers to filtering for items having an attribute value that is less than a stated value in the search query. Thus, the intended filter operations for "greater" and "lesser" are greater than and less than. For example, an utterance including, "Show disposable face masks with three star rating 069 or higher with price less than 10 dollars." In another example, a conversational search request including the words "Search for brand "A" and brand "B" phones greater than 400 dollars," indicates facet-actions "exact" and "greater."

The data storage device 128 can include one or more different types of data storage devices, such as, for example, one or more rotating disks drives, one or more solid state drives (SSDs), and/or any other type of data storage device. The data storage device 128 in some non-limiting examples includes a redundant array of independent disks (RAID) array. In some non-limiting examples, the data storage device(s) provide a shared data store accessible by two or more hosts in a cluster. For example, the data storage device may include a hard disk, a redundant array of independent disks (RAID), a flash memory drive, a storage area network (SAN), or other data storage device. In other examples, the data storage device 128 includes a database.

The data storage device 128 in this example is included within the computing device 102, attached to the computing device, plugged into the computing device, or otherwise associated with the computing device 102. In other examples, the data storage device 128 includes a remote data storage accessed by the computing device via the network 112, such as a remote data storage device, a data storage in a remote data center, or a cloud storage.

The memory 108 in some examples stores one or more computer-executable components, such as, but not limited to, the multi-facet filter manager 120. The multi-facet filter manager 120 is a software component that analyzes an utterance to extract facet-actions and apply corresponding multi-facet filters to item data for identifying candidate items relevant to a conversational search query, such as the conversational search query 142. In some embodiments, the multi-facet filter manager 120 is a machine learning (ML) component that utilizes pattern recognition, modeling, deep learning, or other ML algorithms to analyze data associated with a conversational search query and/or database information to generate more relevant search results responsive to the conversational search query using fewer conversational turns.

The multi-facet filter manager 120, when executed by the processor 106 of the computing device 102, obtains a single utterance 122 of a user including the conversational search query 142. The conversational search query 142 includes a plurality of words identifying a desired item or type of item. The conversational search query 142 also identifies search refinement terms 126 associated with the desired item or type of item.

The multi-facet filter manager 120 extracts one or more facet-actions 148 corresponding to the search refinement terms 126 from the word(s) 144 in the utterance 122. A facet-action in the one or more facet-actions 148 includes a filter action associated with an entity-role of a facet. The multi-facet filter manager 120 applies one or more multi-facet filters 146 to the plurality of items 156 in the catalog 154. The multi-facet filter manager 120 identifies a plurality of candidate items from the plurality of items remaining after application of the plurality of multi-facet filters 146. The multi-facet filter manager 120 generates one or more score(s) 140 for each candidate item remaining after filtering of the items in the catalog. The scoring is performed using the set of scoring criteria 130.

In some embodiments, the multi-facet filter manager 120 selects a candidate item from the plurality of candidate items having a highest score and returns the highest scoring item in a search result 150. In other embodiments, the multi-facet filter manager 120 selects a threshold 152 number of highest scoring items from the plurality of candidate item(s) 138. The result 150 is presented to the user via a UI, such as, but not limited to, the user interface device 110.

The multi-facet filter manager 120 allows customers to find an item or items in a catalog of items by speaking in an interactive manner, as if the user were chatting with a person. The system 100 supports multiple facet search refinement, on a handheld mobile device, such as the user device and/or via a webpage through voice/text. A webpage may be hosted on a webserver, such as, but not limited to, the cloud server 118. The system has the ability to parse and understand diverse actions (e.g., “exact”, “exclude”, “greater”, “lesser”, and “range”) on a product facet. The system 100 accurately returns relevant items from catalog-based filter values. The system is able to improve a customer’s online shopping experience by reducing the number of search turns required to locate a desired item within a catalog of items available for purchase by the user.

In the example shown in FIG. 1, the multi-facet filter manager 120 is implemented on the computing device 102. However, the embodiments are not limited to implementation of the multi-facet filter manager on a computing device. In other embodiments, the multi-facet filter manager 120 is implemented in whole or in part on a cloud server, such as, but not limited to, the cloud server 118.

Given a conversational search query utterance and an extracted named entity (or facet or item attribute), there is a need to identify the appropriate facet action or filter operation for search refinement. For instance, in a user search query say, “blue shirts with more than 3 star rating” with tagged entities “blue” (color) and “3 star rating” (rating), the respective facet actions are “exact” (i.e., user is interested in an exact item match with blue color) and “greater” (i.e. user is interested in ratings above 3). In such cases, the entity type holds additional information that represents its semantic role (for instance, greater than, lesser than, etc.), therefore, use of entity roles is beneficial.

Figure 4:
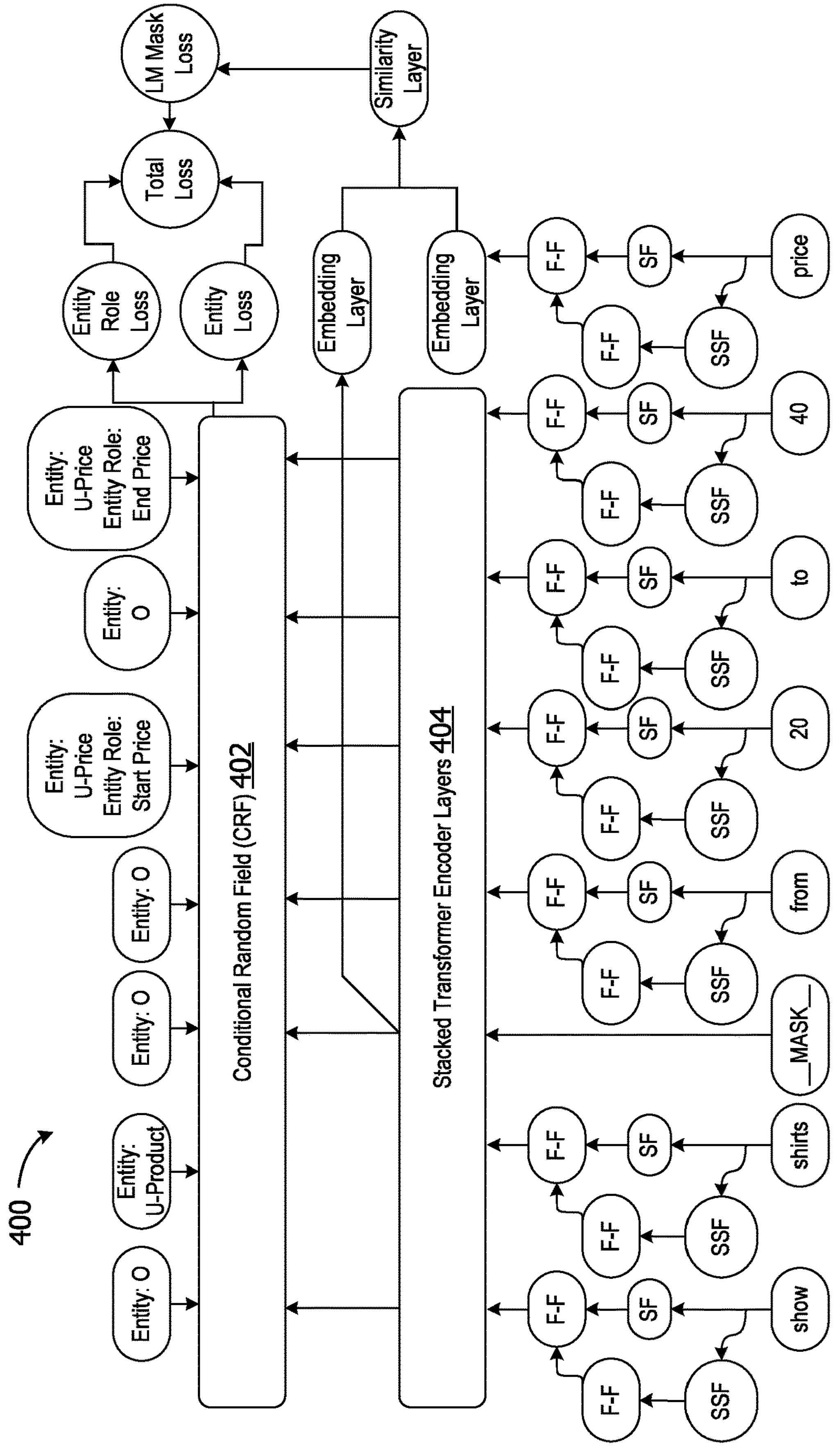
FIG. 4 is an exemplary block diagram illustrating a natural language model for tokenizing an utterance into a plurality of bidirectional tokens.

In other embodiments, the multi-facet filter manager includes a trained natural language processing (NLP) model and API. The system 100 classifies entity roles by feeding the trained or pre-trained NLP model features into transformers coupled with a conditional random field (CRF) decoder layer at the end, as shown in FIG. 4 below. The entity roles are used to identify facet-actions from conversational item search queries in e-commerce domain for improved efficiency, accuracy, and reduced system resource usage.

In the example of FIG. 1, the catalog 154 is a catalog of products, such as, but not limited to, clothing, books, toys, household goods, grocery items, hardware, garden supplies, pet supplies, or any other type of items. However, the examples are not limited to these types of items. In other embodiments, the catalog 154 is a catalog of streaming or video content, such as movies, television shows, or other video content. In still other embodiments, the catalog 154 is a catalog including both goods and services associated with the goods, such as, but not limited to, product assembly services, product delivery services, product warranty services, customization options, etc. In yet another embodiment, the catalog 154 is a catalog of services, such as, but not limited to, travel-related services. Travel-related services optionally include hotel reservations, car rental services, flight booking services, etc.

Figure 2:
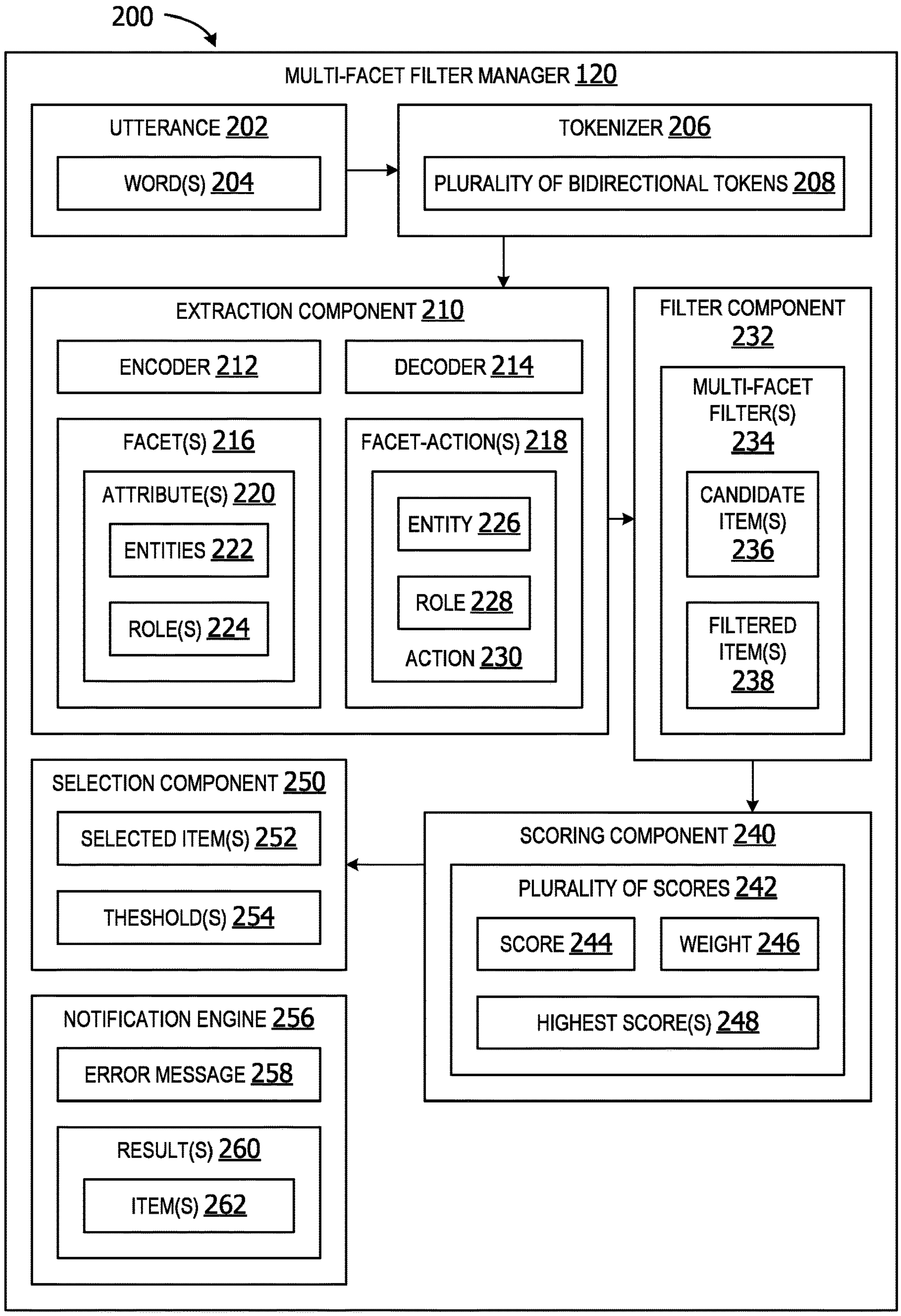
FIG. 2 is an exemplary block diagram illustrating a system for a multi-facet filter manager for performing multi-facet filtering.

FIG. 2 is an exemplary block diagram illustrating a system 200 for a multi-facet filter manager 120 for performing multi-facet filtering. In this example, the multi-facet filter manager 120 receives an utterance 202 including one or more word(s) 204. The word(s) 204 are optionally verbal words and/or text written words.

A tokenizer 206 tokenizes the word(s) 204 in the utterance 202 into a plurality of bidirectional tokens 208. However, the embodiments are not limited to bidirectional tokens. In other embodiments, the utterance is tokenized into unidirectional tokens.

An extraction component 210 includes an encoder 212 and a decoder 214. The encoder 212 optionally includes an input encoder and/or a context encoder. The input encoder encodes basic elements (e.g., 208 tokens, characters, and gazetteers) of raw text into distributed representations, which are further fed into the context encoder. Character is another unit to encode raw text instead of or in addition to tokens. The context encoder encodes the output of the input encoder into a semantic representation of context using unidirectional or bidirectional recurrent neural networks (RNN) to encode sequence context. Pre-trained transformer models, such as generative pre-trained (GPT) and bidirectional encoder representations from transformers (BERT) models can be used to improve NER performance. RNN and CRF are available for use at tag decoders of NER models. The decoder 214 predicts a sequence of entity labels and entity roles from a stack of encoder transformer outputs sequences corresponding to input sequence.

The extraction component 210 extracts one or more facet(s) 216 and/or facet-action(s) 218 from the utterance 202. The facet(s) 216 represents one or more attribute(s) 220 of the desired item or type of item identified in the utterance. The facet(s) includes one or more entities 222 and one or more corresponding role(s) 224 of those entities.

The facet-action(s) 218 includes one or more filter actions associated with the facet(s). In this example, an action 230 is associated with a specific entity 226 and role 228 of the entity 226. The system 200 enables named entity recognition (NER) to identify mentions of attributes and search refinement actions from text. The item name entities are named entities (NEs). The search refinement terms are identified and mapped to a specific entity.

A filter component 232 selects one or more multi-facet filter(s) 234 for application against a catalog of items. The filtered item(s) 238 are removed. The remaining items are candidate item(s) 236.

A scoring component 240 generates a plurality of scores 242 associated with the candidate item(s) 236. Each score 244 is generated using scoring criteria. In some embodiments, the scores are weighted in accordance with a weight 246 corresponding to one or more criteria in the scoring criteria. One or more of the candidate items with the highest score(s) 248 are selected by a selection component 250 for inclusion in search result(s) 260 returned to the user.

The selection component 250 optionally utilizes one or more threshold(s) 254 to select the one or more selected item(s) 252 from the candidate item(s) 236 based on the plurality of scores 242. In some embodiments, the selection component selects a threshold number of highest scoring or highest ranking candidate items for inclusion in the search result(s) 260. In other embodiments, the selection component 250 selects items having a score which exceeds a threshold score.

A notification engine 256 generates notifications which are transmitted to the user via a user device. In some embodiments, the notification engine 256 generates an error message 258 if the system fails to identify at least one item responsive to the conversational search query. In other examples, the notification engine 256 generates one or more result(s) 260 including one or more responsive item(s) 262 for transmission to the user. The result(s) 260 are optionally included in a result notification which is displayed to the user via a user interface on a user device, such as the user device 116 in FIG. 1.

Figure 3:
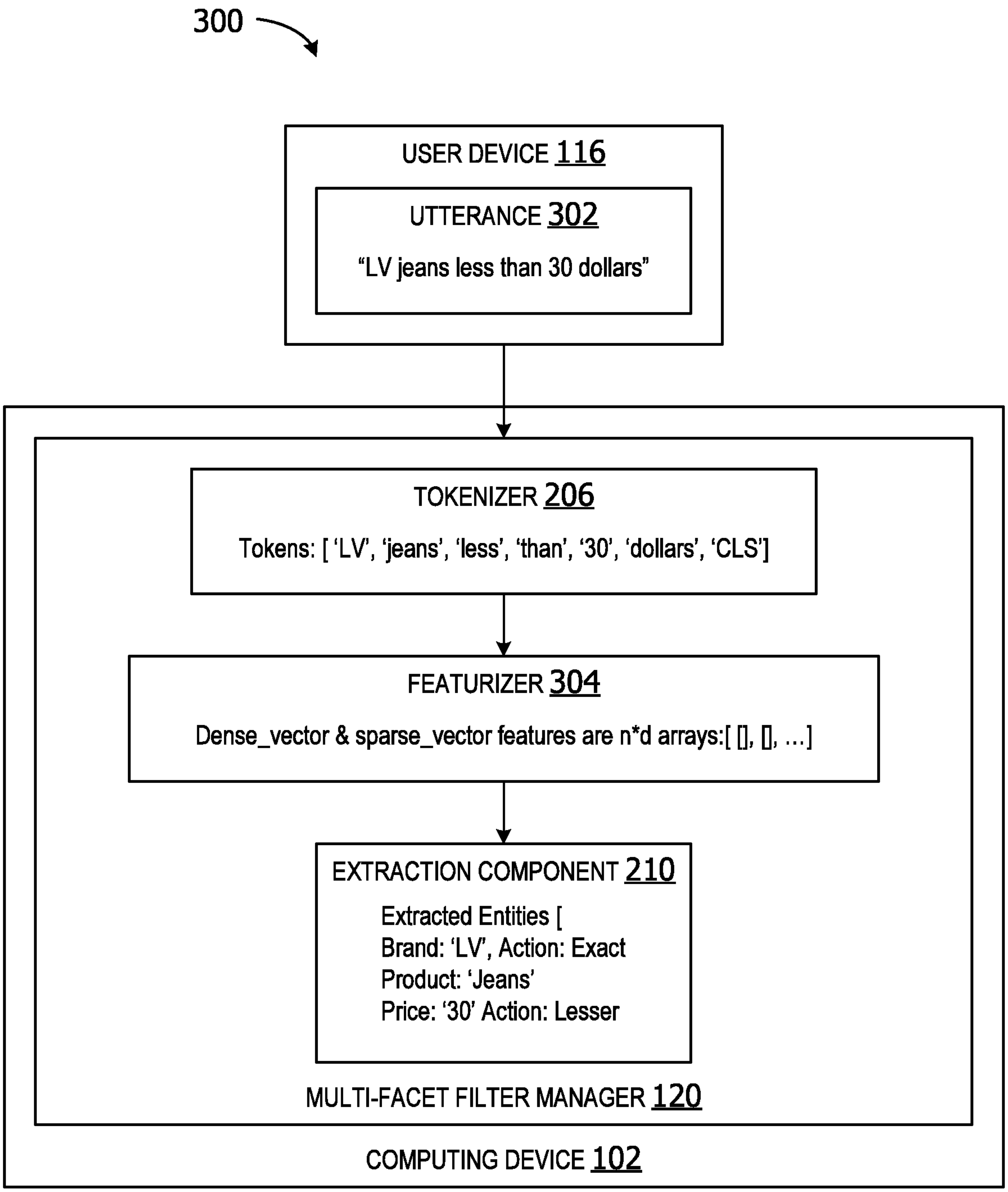
FIG. 3 is an exemplary block diagram illustrating a multi-facet filter system 300 for multi-facet conversational item searches.

Turning now to FIG. 3, an exemplary block diagram illustrating a multi-facet filter system 300 for multi-facet conversational item searches is shown. In this example, the multi-facet filter manager 120 on the computing device 102 receives an utterance 302 from a user device 116 via a network, such as, but not limited to, the network 112 in FIG. 1. The utterance in this non-limiting example includes the phrase "'Brand 'LV' jeans less than 30 dollars."

The tokenizer 206 tokenizes the text of the provided attribute of the incoming message. In this example, the tokenizer 206 generates a plurality of bidirectional tokens representing the phrase.

A featurizer 304 generates vectors representing the words in the phrase. The featurizer 304 computes sentence and sequence level feature representations for dense feature attributes. The featurizer optionally includes a convert model, a count vectorizer and/or regex features. In an example, a count vectorizer that creates a sequence of token counts features 4-gram char features: combinations of 'n' grams.

An extraction component 210 extracts an item, entities, roles, and actions. In this example, the item (product) is "jeans". The entity-roles are brand "LV" and price "30". The action for the brand is "exact" as the user desires search results conforming to a specific brand. The action for the entity-role price is "lesser" as the user desires search results including items that are priced at less than thirty dollars. In this manner, the system provides for specification of the entity and entity role in each token from an utterance. The multi-facet filter system architecture optionally includes a stack of heavy transformers and CRF tagging for entity and entity role prediction, as shown in FIG. 4 below.

FIG. 4 is an exemplary block diagram illustrating an architecture associated with a natural language model 400 of a multi-facet filter manager for tokenizing an utterance into a plurality of bidirectional tokens. The model 400 includes a CRF 402 and stacked transformer encoder layers 404. The model 400 is a masked language model, which predicts a masked token in a sequence, and the model attends to tokens bidirectionally. The model 400 has full access to left and right tokens. The input sentences are treated as sequences of tokens that are encoded by a stack of transformer layers. The encoder maps input sequence (x1, . . . , xn) to a sequence of continuous representations E=(e1, . . . , en), from the CRF decoder to produce the sequence of output entity tag labels (l1, . . . , ln), entity-roles (r1, . . . , rn) predictions and the similarity layer to help reconstructing the mask.

Input sequences are treated as sequences of tokens where tokens are words/sub-words based on the language model tokenization. For dense features, the system extracts input sequence features from the various pre-trained language models, such as GPT 2, BERT, DistilBERT, conversational representations from transformers (convert) from PolyAI and robustly optimized BERT (RoBERTa) through HuggingFace. Side sparse features (SSF) are one-hot token level encodings and multi-hot character n-gram (n<=4) features. The sparse features (SF) are passed to the feed-forward (F-F) layer whose weights are shared through the input sequence. The feed forward neural network (FNN) layer output and dense sequence features are concatenated before passing to Transformer encoder layers.

For bidirectional context encoding in the input sequences, the system uses stacked transformer layers with relative position attention. Each transformer encoder layer is composed of multi-headed attention layers and point wise feed forward layers. These sub layers produce an output of dimension $^{d}\text{model}=25$.

The number of attention heads: $^{N}\text{heads}=4$. The number of units in transformer: S=256. The number of transformer layer: L=4.

The decoder for named entity recognition task is CRF which jointly models the sequence of tagging decisions of an input sequence. CRF layers are ordered by entity followed by entity role recognition. The decoder predicts a sequence of entity labels and entity roles from transformer output sequences corresponding to input sequences.

The mask modeling task is to predict random masked input tokens. In this example, a random 15% of all tokens in each sequence is masked. If the token "T" is selected, 70% of the time the "T" token is replaced with [_MASK_] token, and in 10% of the time with a random token vector, while in the remaining 20% of the time the "T" token is unchanged. This is to mitigate the mismatch between pre-training and fine-tuning as [_MASK_] token does not present in fine-tuning. The transformer output of selected "T" token is passed to dot-product loss. The model 400 is trained in multi-task manner by optimizing the total loss as follows:

$$L_{TOTAL} = L_{ENTITY} + L_{ENTITY\ ROLE} + L_{MASK}$$

where is total loss. For model training, in some embodiments, an optimizer with an initial learning rate of 0.001 is used. The batch size is increased throughout training progress as a source of regularization from 64 to 256.

Figure 5:
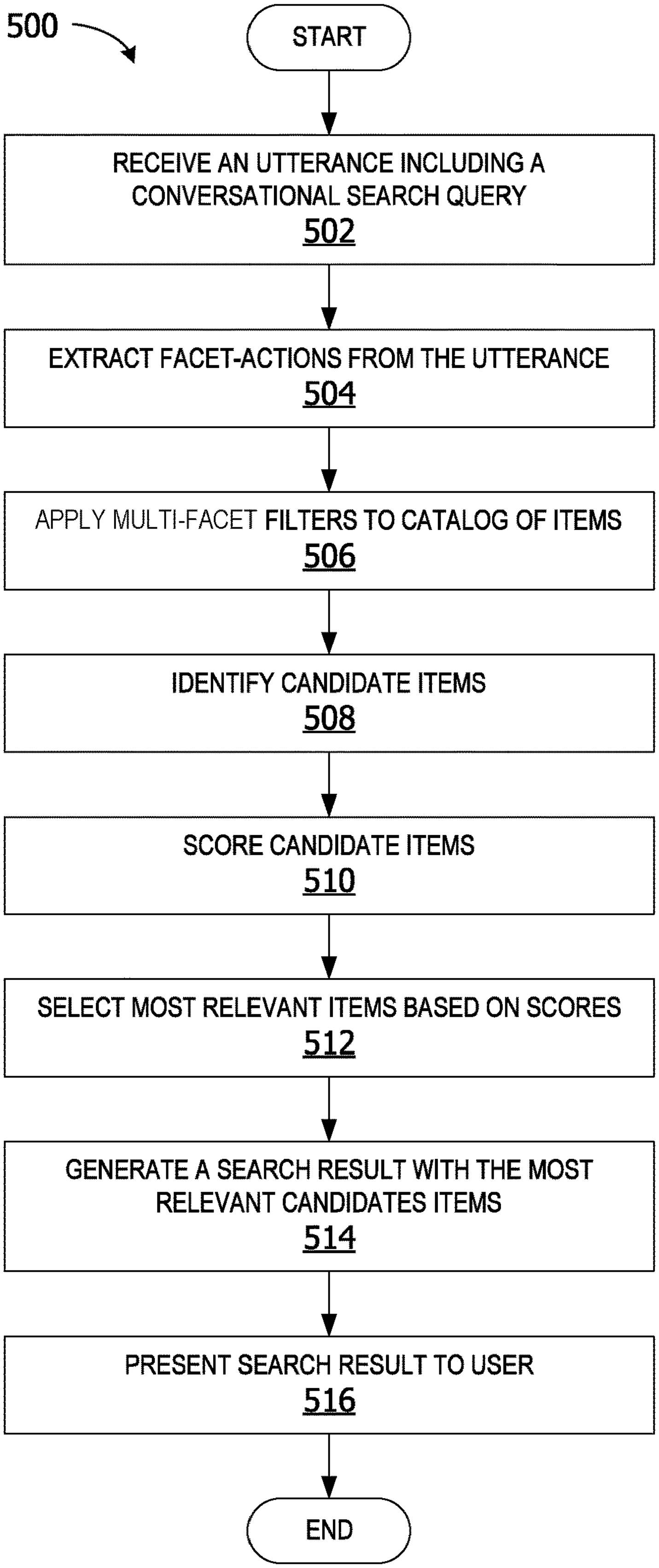
FIG. 5 is an exemplary flow chart illustrating operation of the computing device to generate multi-facet search results based on an utterance.

FIG. 5 is an exemplary flow chart illustrating operation of the computing device to generate multi-facet search results based on an utterance. The process 500 shown in FIG. 5 is performed by a multi-facet filter manager component, executing on a computing device, such as the computing device 102 or the user device 116 in FIG. 1.

The process begins by receiving an utterance including a conversational search query at 502. The utterance includes verbal utterances or written utterances, such as an utterance entered via text. The multi-facet filter manager extracts facet-actions at 504. The facet-actions are extracted from the utterance by an extractor, such as, but not limited to, the extraction component 210 in FIG. 2 and FIG. 3. The multi-facet filter manager applies multi-facet filters to the catalog of items at 506. The catalog of items is a catalog, such as, but not limited to, the catalog 154 in FIG. 1. The multi-facet filter manager identifies candidate items at 508. The candidate items are scored at 510. The score indicates each candidate item predicted relevance as a response to the search. The multi-facet filter manager selects most relevant items based on one or more scores at 512. The multi-facet filter manager generates a search result with the most relevant candidate items at 514. The search result is presented to the user at 516. In this example, the result is presented to the user via a UI, such as, but not limited to, the user interface device 110 in FIG. 1 and/or a UI associated with the user device 116 in FIG. 1.

While the operations illustrated in FIG. 5 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 5.

Figure 6:
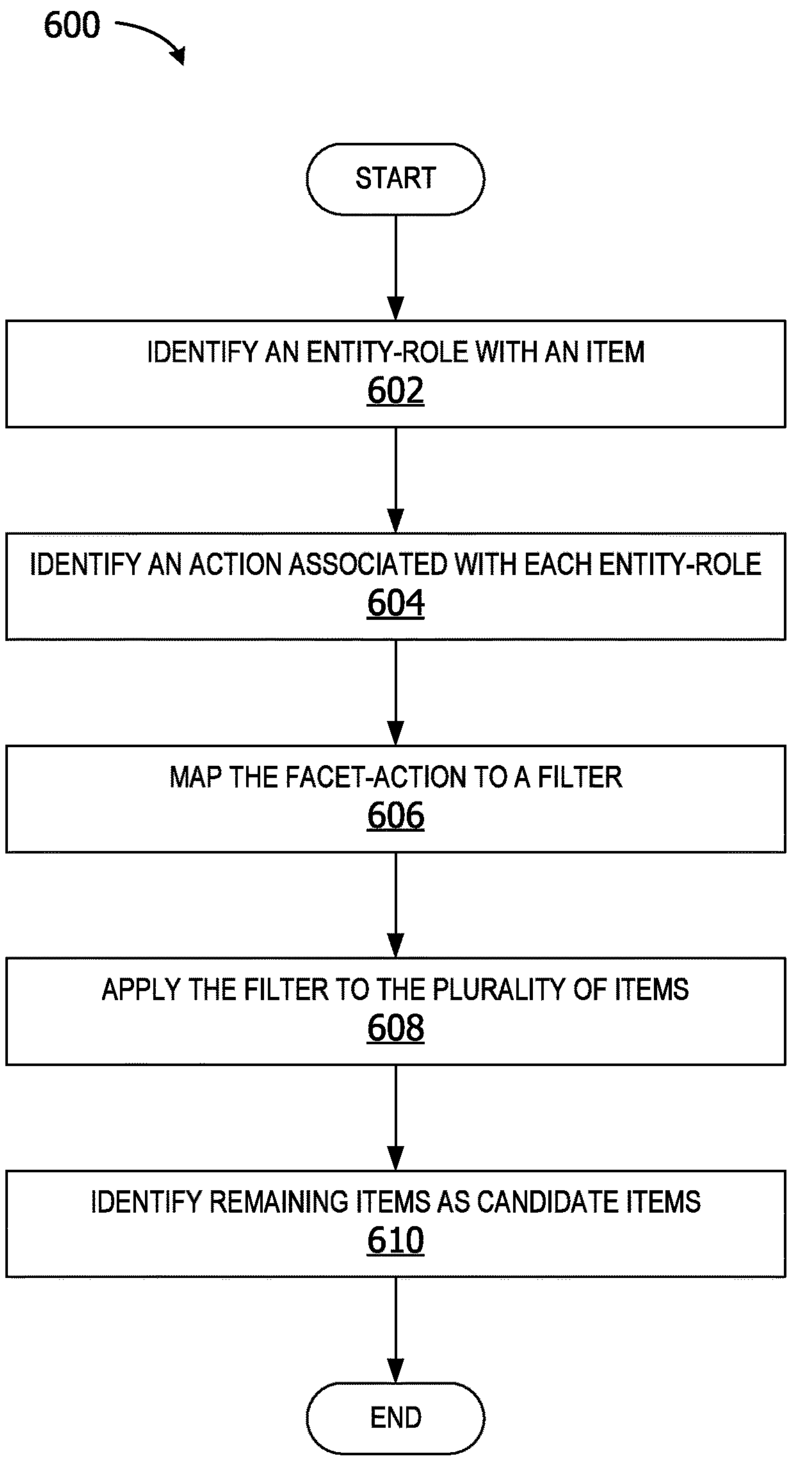
FIG. 6 is an exemplary flow chart illustrating operation of the computing device to extract filter-actions for use in filtering items.

Referring now to FIG. 6, an exemplary flow chart illustrating operation of the computing device to extract filter-actions for use in filtering items is shown. The process 600 shown in FIG. 6 is performed by a multi-facet filter manager component, executing on a computing device, such as the computing device 102 or the user device 116 in FIG. 1.

The process begins by identifying an entity-role associated with an item using an utterance at 602. The entity-role is extracted from the utterance by an extraction component using an encoder and decoder, such as, but not limited to, the encoder 212 and decoder 214 in FIG. 2. The multi-facet filter manager identifies an action associated with each entity-role at 604. The action is a facet-action associated with a specific facet (entity-role). The facet-action is mapped to a filter at 606. The filter is applied to the plurality of items to eliminate items which are irrelevant to the search results at 608. The multi-facet filter manager identifies the remaining items as candidate items at 610. The candidate items are items which are responsive to the conversational search query. The process terminates thereafter.

While the operations illustrated in FIG. 6 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 6.

Figure 7:
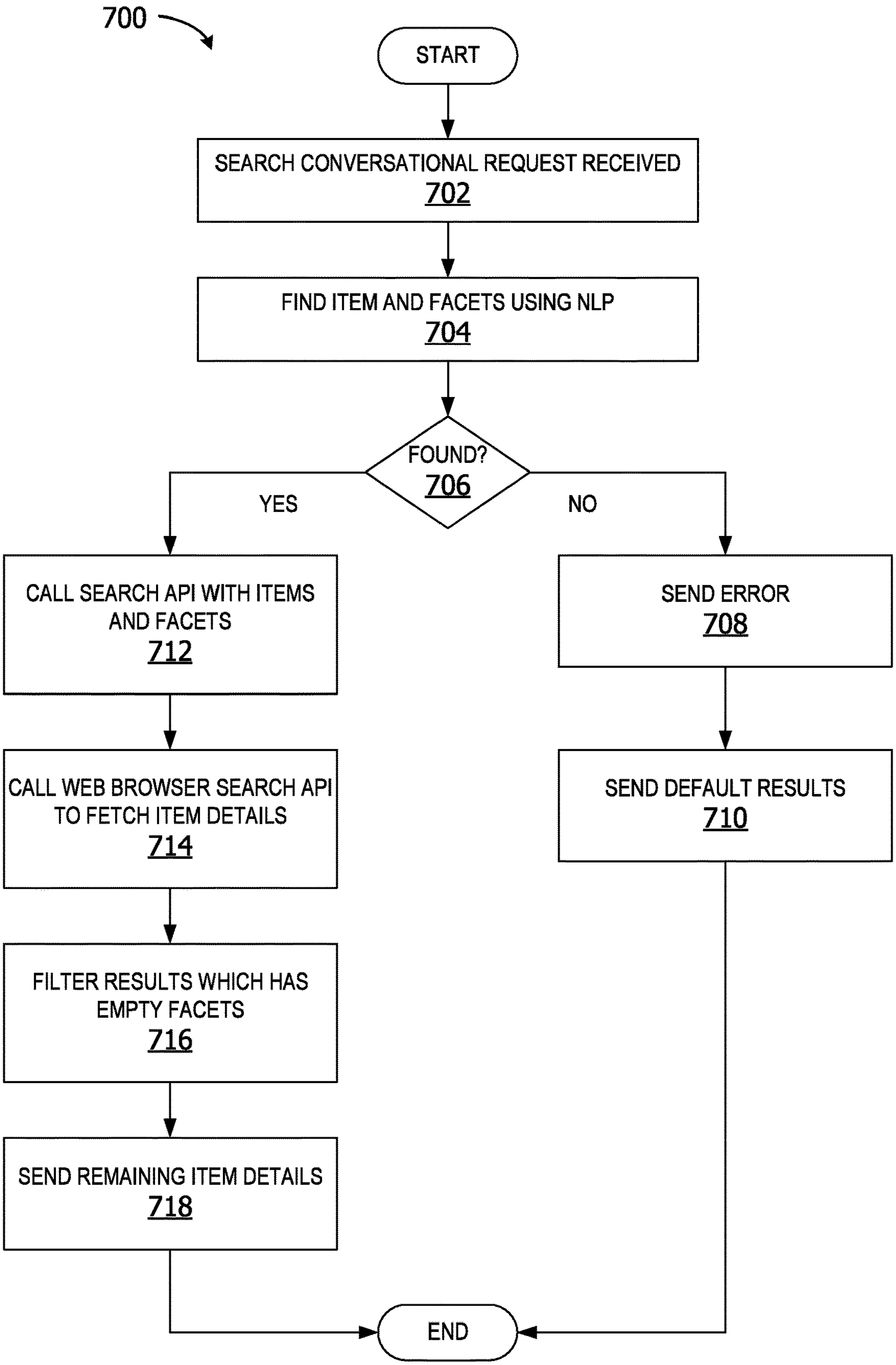
FIG. 7 is an exemplary flow chart illustrating operation of the computing device to identify relevant items for a search using facets and facet-actions extracted from an utterance.

FIG. 7 is an exemplary flow chart illustrating operation of the computing device to identify relevant items for a search using facets and facet-actions extracted from an utterance. The process 700 shown in FIG. 7 is performed by a multi-facet filter manager component, executing on a computing device, such as the computing device 102 or the user device 116 in FIG. 1.

A conversational search request is received at 702. An attempt is made to find an identification of an item and facets in the conversational search query using NLP at 704. A determination is made whether the item and facets are found at 706. In one example, the facets include price and product ratings. If not, the system sends an error message at 708. Default search results are returned to the user at 710. The process terminates thereafter.

If an item and facets are found in the conversational search request, a search API is called with the item and facets at 712. A web browser search API is called to fetch item details at 714. Results are filtered which have empty facets at 716. If the facets are price and product, the items having price and/or product information that fail to conform to the facet values are removed (filtered out). The remaining item(s) (candidate items) details are sent at 718. The candidate items are included in a search result notification or other search result page output to the user. The process terminates thereafter.

While the operations illustrated in FIG. 7 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 7.

Figure 8:
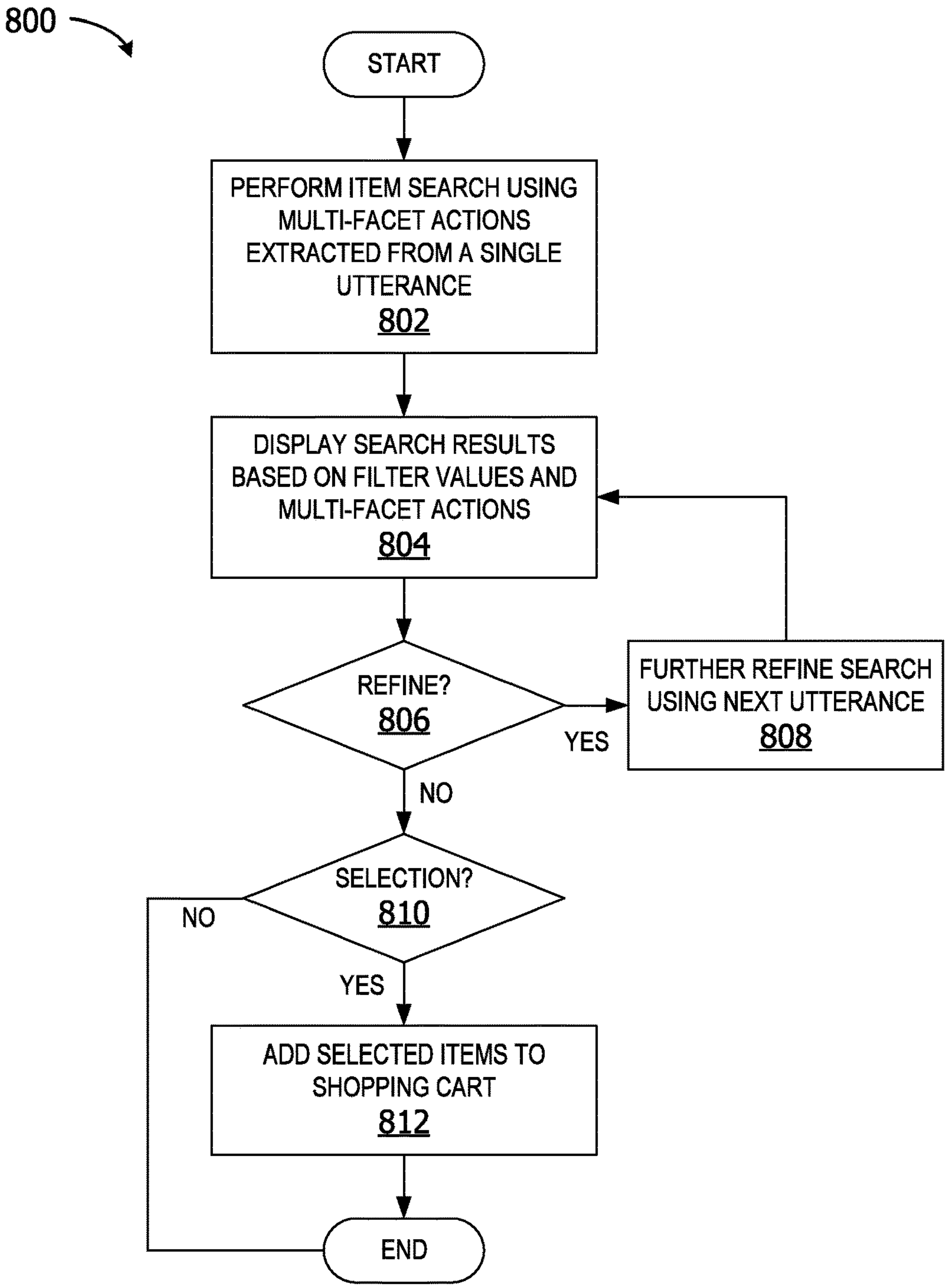
FIG. 8 is an exemplary flow chart illustrating operation of the computing device to refine search results based on multi-facet actions identified in an utterance.

FIG. 8 is an exemplary flow chart illustrating operation of the computing device to refine search results based on multi-facet actions identified in an utterance. The process 800 shown in FIG. 8 is performed by a multi-facet filter manager component, executing on a computing device, such as the computing device 102 or the user device 116 in FIG. 1.

The process begins by performing an item search using multi-facet actions extracted from a single utterance at 802. The multi-facet actions are extracted by a multi-facet filter component, such as the multi-facet filter manager 120 in FIG. 1. Search results are displayed at 804. The search results are based on filter values and the multi-facet actions at 804. A determination is made whether a next (additional) utterance is received with additional facets and/or actions to further refine the search results is received at 806. If yes, the search results are further refined using the next utterance at 808. If no additional information is received to refine the search results, a determination is made whether a user selection of one or more item(s) from the candidate items returned in the search results is made at 810. If yes, the selected item(s) are added to a user shopping cart at 812. The process terminates thereafter.

While the operations illustrated in FIG. 8 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 8.

Referring now to FIG. 9, an exemplary table 900 of entities associated with facets extracted from utterances by a multi-facet filter manager is shown. The multi-factor filter manager performance on conversational search multi-factor analysis named entity-role grouped by item attributes (facets) is shown. In this example, the entities (facets) include product, brand, color, discount, material, price, and review rating. However, the embodiments are not limited to the entities (facets) shown in table 900. In other examples, the entities (facets) can include other item attributes, such as, but not limited to, source of item (where made), intended age range of item (infant, toddler, child, etc.), genre, size, or any other item attribute.

FIG. 10 is an exemplary table 1000 of filter actions associated with facet-actions. The multi-factor filter manager performance on conversational search multi-factor analysis named entity and entity-roles (refinement type actions) is shown in table 1000. In this example, the facet-actions include greater, exclude, start, end, and lesser. However, the embodiments are not limited to the actions shown in table 1000. In other embodiments, the actions can include range, exact and other search refinement filter actions.

For evaluation of the multi-factor filter manager, a conversational search multiple factor analysis (MFA) data set consisting of two-hundred and three thousand conversational search utterances from voice shopping was created. This dataset has a training subset with one-hundred eighty three thousand utterances and a test subset with twenty-three thousand utterances. The utterance in each data example has a random number of (between 1 and 3) item attributes and refinement actions for each attribute along with product. Follow-up conversational search utterances may not contain item (product) identifying information. This data is generated from ten-thousand seed voice-based search refinement utterance variations, using synonym-tuple based data augmentation of the most popular items from various departments like home, clothing, household essentials, and item attributes such as brand, color, savings, material, price, and rating. The test data created with unseen items and attributes are also from the same categories.

Table 900 in FIG. 9 above and table 1000 in FIG. 10 above shows the multi-facet filter manager (model) evaluation results on MFA data set. For the MFA entity labels, beginning, inside, last, other and uni-gram (BILOU) tagging schema is used for entities and roles assigned to all entity tokens. BILOU tags assist with splitting the various items based on the "Begin", "Inside", "Last", "Uni-gram", and "Other" token information. Entity roles include "Greater," "Lesser," "Start," "End," and "Exclude".

In some embodiments, a system is provided for multi-facet product search from dialog. The entity actions are used to extract facet actions from item search queries in e-commerce domain, achieving reasonably good F1 scores (96%). Several factors like demarcation of entity spans within an utterance, use of language models for modelling and availability of entity type information to the system, are shown to influence the facet action predictions affirmatively.

Figure 11:
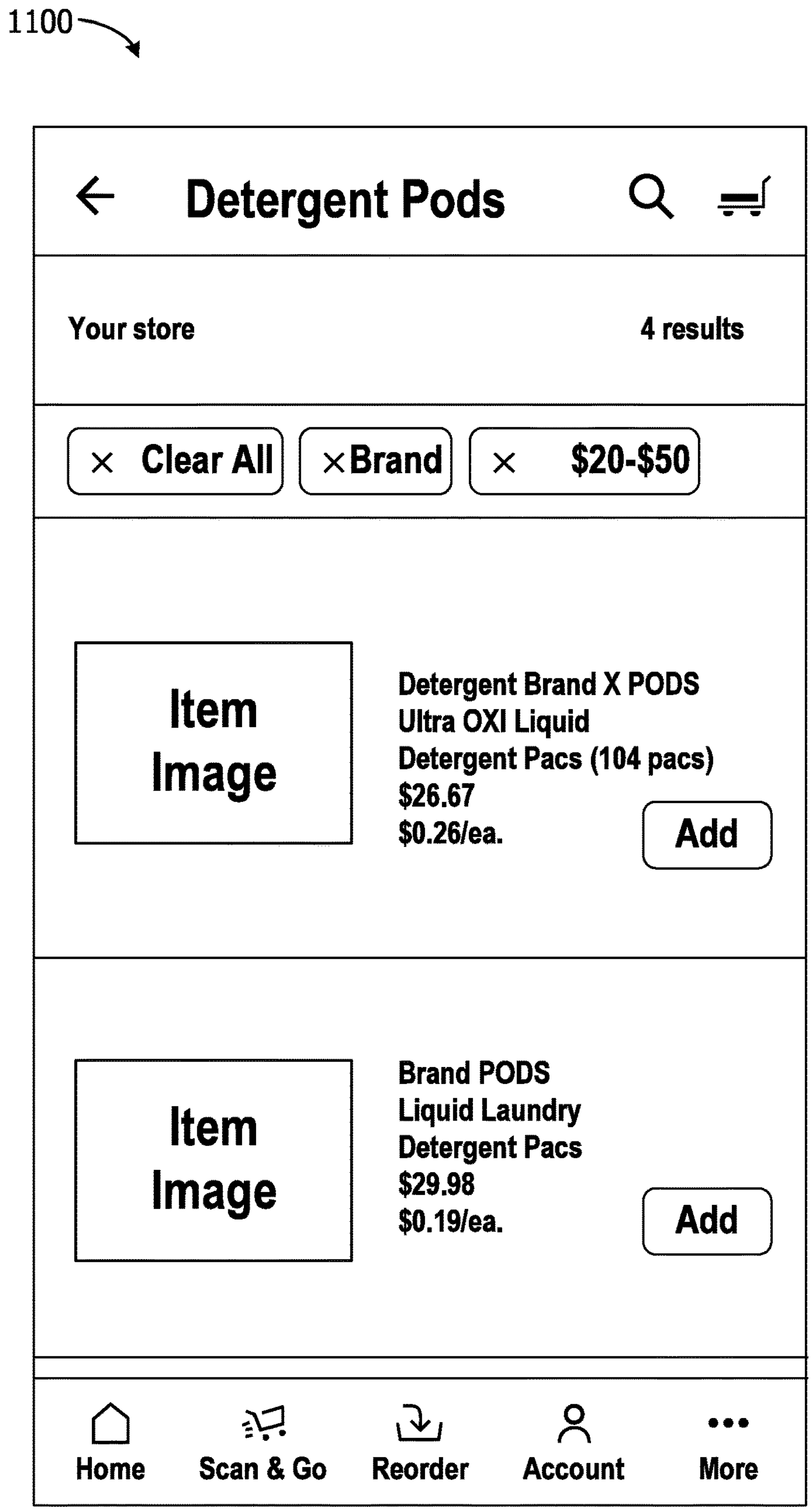
FIG. 11 is an exemplary screenshot of a conversational search result including highest scoring items in the candidate items.

FIG. 11 is an exemplary screenshot 1100 of a conversational search result including highest scoring items in the candidate items. In an example scenario, a user provides a conversational search query in the form of an utterance stating "find detergent pods with price less than thirty and four star rating. The system finds the item (detergent pods) and facets (price and rating). The system identifies the filter actions (lesser and equal). The system generates a query string using the item, facets, and actions. The system uses an API to access a catalog of items and fetch item identifiers (IDs) for items having attributes matching the query. The system fetches the candidate item details corresponding to the candidate item IDs. The top candidates are selected. The top candidates are predicted to be most relevant to the user based on the query and item descriptions. The top candidates are presented to the user in search results via a user interface.

In this example, the search results include two candidate items which are responsive to a user's conversational search query. If the user selects one of the two items, the selected item is placed into the user's shopping cart for purchase.

Figure 12:
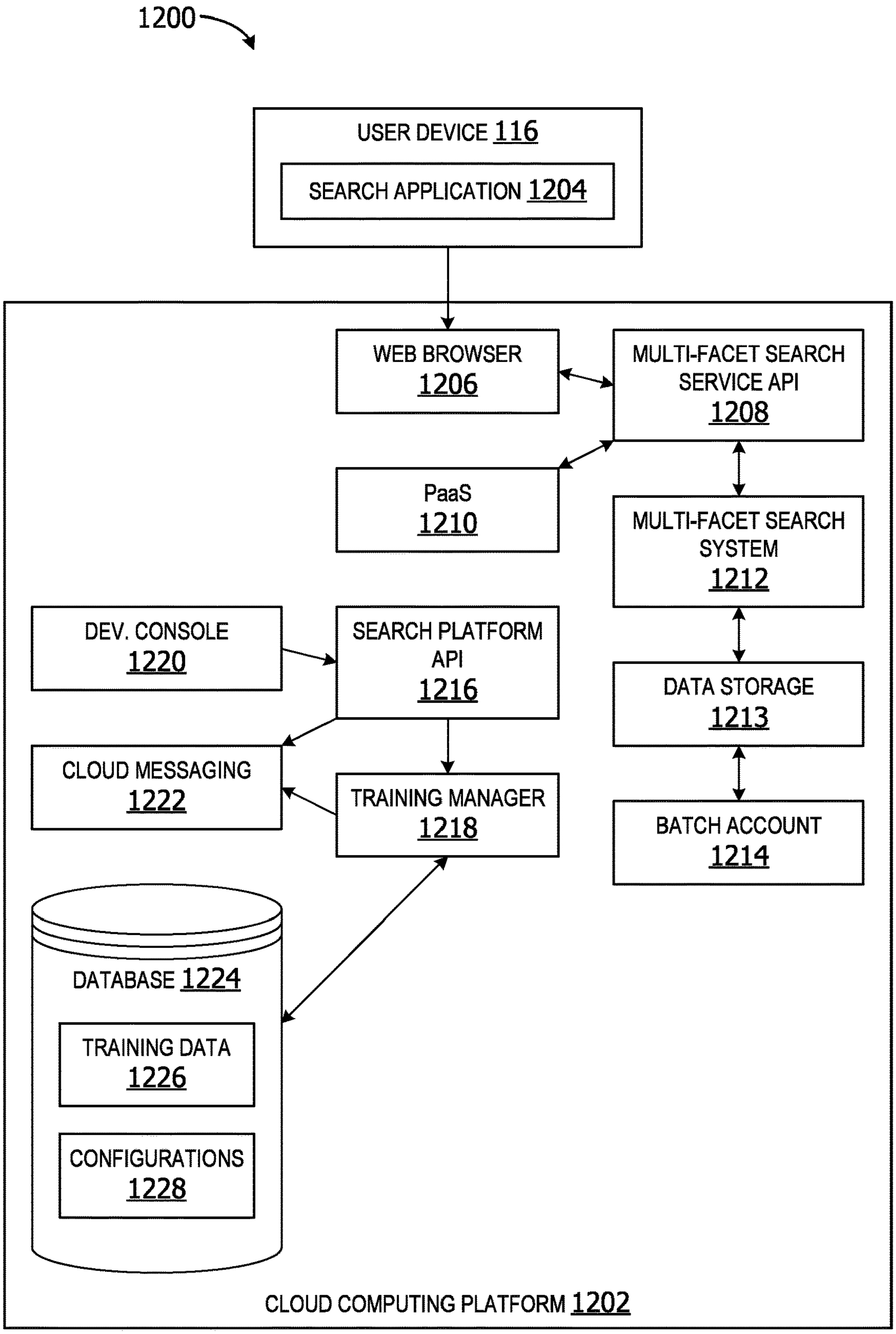
FIG. 12 is a block diagram illustrating an exemplary system architecture for implementing multi-facet filtering of items responsive to a conversational search query.

FIG. 12 is a block diagram illustrating an exemplary system architecture 1200 for implementing multi-facet filtering of items responsive to a conversational search query. The conversational search query is provided via an utterance entered by a user on a user device 116. A search application 1204 associated with a merchant is connected to a merchant web page via a web browser 1206 of the user device 116. A multi-facet search service API 1208 enables the search application 1204 to access the multi-facet search system 1212. The multi-facet search system 1212 is a system, such as, but not limited to, the system 100 in FIG. 1 and/or the system 300 in FIG. 3. The multi-facet search system includes a multi-facet filter component, such as, but not limited to, the multi-facet filter manager 120 in FIG. 1 and FIG. 2.

A cloud platform as a service (PaaS) 1210 optionally hosts the multi-facet search service API 1208. The multi-facet search system 1212 stores data in a data storage 1213 and/or retrieves data from the data storage 1213. The data storage 1213 is a device for storing data, such as, but not limited to, the data storage device 128 in FIG. 1. The system optionally also includes a batch account 1214. The batch account 1214 is used to help manage workloads in the cloud computing platform 1202.

The cloud computing platform 1202 optionally includes a developer's console 1220 that is used to access, update, and utilize a search platform API 1216 and/or a cloud messaging 1222 service. A training manager 1218 enables training of natural language processing ML models using customized training data. A database 1224 stores data, such as training data 1226 and/or configurations data 1228. The training data 1226 includes annotated training data sets and configurations 1228 for training the ML models to perform the multi-facet filtering.

Additional Examples

In some embodiments, the multi-facet filter system enables conversational search recognition of named entities (e.g., products and their attributes), entity roles, and their actions, as well as enabling backend search to generate bidirectional tokenized query strings from the identified item and its facet-actions (attribute and refinement actions).

The system, in some examples, is a conversational product search system used for searching products with facets and facet actions (to help customers find items through talking or texting). The system parses natural language (spoken words and text) using an NLP ML model(s) to convert words into products and product filter actions. The system handles multiple product filter utterances without requiring conjunctions or punctuation. The machine learning model includes a featurizer, a transformer(s), and an extractor to identify products, product attributes, and actions. The system refines search queries using multiple product facets. The system identifies product facets and aspect-oriented entity role to identify facet actions in search queries.

In an example scenario, a two-turn sample voice search conversation is parsed by the multi-facet filter system search: "women's watches with four plus star rating and price less than 100 dollars not from brand A" with an additional refinement utterance of "add price below 150 too." In this example, the first utterance is analyzed to extract the item "women's watches," facets of "rating" and "price" with facet-actions of "exact," "greater," and "lesser." The follow-up phrase omits the item "watches" and adds the facet "price" and facet-action "lesser."

In another example, the multi-facet filter system analyzes a phrase "show disposable face masks with three star rating or higher with price less than ten." In this example, the system extracts the item "disposable face masks" with facets "rating" and price." The facet-actions include "greater" and "lesser." The multiple facets and facet-actions are extracted from a single utterance in a single conversational turn. The system is enabled to return relevant items in a first set of search results based on a single search query, thereby improving efficiency and accuracy of the search results returned to the user while reducing system resource usage consumed in generating search results.

In some embodiments, the system includes an AI/ML NLP model that identifies both product facets (desired attributes) and aspect-oriented entity role to identify facet actions in natural language conversational search queries. The model is a non-generative AI model trained using customized training data for model. The system makes use of both the multi-facet aspects of the search engine as well as the natural language based criteria which are introduced on the fly. The system extracts the facet related terms and uses the search engine to filter the data based upon those criteria.

The system, in other embodiments, performs multiple facet search refinement of a search query input as either a spoken or written (text) utterance. The search query is a query for searching products in a catalog. The search refinement is performed using multi-facet filter actions identified in the utterance. The system evaluates the non-facet portions and uses the natural language processes to interpret the query and applies this to the previously filtered data. The system also assesses the similarity of words, such as colors used in the search (i.e., a blue shirt). The system parses natural language (spoken words and text) search queries (utterances) using one or more NLP ML models to convert words into products and product filter actions without requiring conjunctions or punctuation.

In other embodiments, the multi-facet filter manager includes a featurizer, transformers (convert to bidirectional tokens), and extractor (encoder and decoder to extract entity and entity-role and corresponding entity-role actions from query) to identify product, product attributes (facets) and actions. A trained ML model is used to identify the facets and facet actions from the query string. The system identifies candidate items from the catalog using the identified facets and filter actions. Results are scored.

In some embodiments, a score is given to each entry from the search engine and another score is given to each entry from the NLP portion. These two sub-scores are weighted and summed to provide a single score for each result. The weights are configurable by the user depending upon their preference. The addition of the NLP and scoring improves the search results. A higher score indicates a more relevant candidate. The system returns more accurate search results which include more relevant items from a catalog based on filter values to reduce the number of search returns and reduce the number of user actions required to obtained search results responsive to the natural language search result.

Alternatively, or in addition to the other examples described herein, examples include any combination of the following:

- convert the single utterance into a bidirectional tokenized query string comprising a plurality of bidirectional tokens representing the plurality of words, wherein an extractor analyzes the plurality of bidirectional tokens to extract the plurality of facet-actions from the single utterance;
- wherein the set of scoring criteria comprises criterion for scoring a degree of semantic similarity between a description of a candidate item and search criteria provided within the single utterance;
- generate a plurality of search relevance scores for the plurality of candidate items, wherein each score in the plurality of search relevance scores indicates a degree of relevance of a candidate item relative to other candidate items in the plurality of candidate items;
- identify an entity associated with an attribute of the item;
- recognize an entity role corresponding to the entity;
- map the entity and entity role to a set of actions, wherein a facet-action is associated with the entity, entity role, and the set of actions mapped to the entity role;
- generate two sub-scores associated with each candidate item, wherein the two sub-scores are weighted and summed to obtain the score for each candidate item;
- identify a first role associated with an entity and a second role associated with the entity;
- identify a first action associated with the entity and first role;
- identify a second action associated with the entity and the second role, wherein a first facet-action corresponds to the first action and a second facet-action corresponds to the second action;
- identify a price entity associated with an item, wherein the price entity is associated with a first numeric value role and a second numeric value role, the first numeric value role being lower than the second numeric value role;
- identify a first facet-action of greater than for the first numeric value role and a second facet-action of less than for the second numeric value role, wherein a first filter associated with the first facet-action and a second filter associated with the second facet-action are applied to remove items having a price that falls outside a specified price range;
- receiving a single utterance of a user comprising a conversational search query, the single utterance including a plurality of words identifying an item and a plurality of search refinement terms associated with the item;

- extracting a plurality of facet-actions corresponding to the plurality of search refinement terms from the plurality of words, a facet comprising an item attribute and a facet-action comprising an action corresponding to the item attribute;
- identifying a plurality of multi-facet filters corresponding to the plurality of facet-actions;
- applying the plurality of multi-facet filters to a plurality of items in a catalog, the plurality of multi-facet filters removing items which are irrelevant to the conversational search query, wherein a plurality of candidate items remaining after application of the plurality of multi-facet filters;
- scoring the plurality of candidate items based on a degree of responsiveness of each candidate item to the conversational search query;
- selecting a set of items from the plurality of candidate items having a score exceeding a threshold score;
- generating a search result comprising the selected set of items, wherein the search result is presented to the user via a user interface device;
- identifying an entity associated with an attribute of the item; recognizing an entity role corresponding to the entity; and identifying a set of actions corresponding to the entity and entity role, wherein a facet-action is associated with the entity, entity role, and the set of actions mapped to the entity role;
- wherein a facet in the plurality of facet-actions comprises at least one of a brand, price, rating, discount, color, material, source of item, and size associated with an item;
- wherein a facet-action in the plurality of facet-actions comprises at least one of a greater than action, a less than action, a range action, an exclude action, and an exact match action;
- generating a plurality of search relevance scores for the plurality of candidate items, a score in the plurality of search relevance scores indicating a degree of relevance of a candidate item relative to other candidate items in the plurality of candidate items;
- selecting a set of most relevant items from the plurality of candidate items that are responsive to the conversational search query based on the plurality of search relevance scores;
- training a machine learning model using a set of customized training data to filter items based on multiple item attributes and multiple filter actions;
- generating a first facet-action corresponding to a first entity and first role associated with the first entity;
- generating a second facet-action corresponding to the first entity and a second role associated with the first entity;
- applying a first filter to a set of items, wherein the first filter corresponds to the first facet-action; and
- applying a second filter to the set of items, wherein the second filter corresponds to the second facet-action.

At least a portion of the functionality of the various elements in FIG. 1, FIG. 2, FIG. 3, FIG. 4, and FIG. 12 can be performed by other elements in FIG. 1, FIG. 2, FIG. 3, FIG. 4 and FIG. 12, or an entity (e.g., processor 106, web service, server, application program, computing device, etc.) not shown in FIG. 1, FIG. 2, FIG. 3, FIG. 4, and FIG. 12.

In some examples, the operations illustrated in FIG. 5, FIG. 6, FIG. 7, and FIG. 8 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium having instructions recorded thereon which when executed by a computer device cause the computer device to cooperate in performing a method of multi-facet item search refinement, the method comprising receiving a single utterance of a user comprising a conversational search query, the single utterance including a plurality of words identifying an item and a plurality of search refinement terms associated with the item; extracting a plurality of facet-actions corresponding to the plurality of search refinement terms from the plurality of words, a facet comprising an item attribute and a facet-action comprising an action corresponding to the item attribute; identifying a plurality of multi-facet filters corresponding to the plurality of facet-actions; applying the plurality of multi-facet filters to a plurality of items in a catalog, the plurality of multi-facet filters removing items which are irrelevant to the conversational search query, wherein a plurality of candidate items remaining after application of the plurality of multi-facet filters; scoring the plurality of candidate items based on a degree of responsiveness of each candidate item to the conversational search query; selecting a set of items from the plurality of candidate items having a score exceeding a threshold score; and generating a search result comprising the selected set of items, wherein the search result is presented to the user via a user interface device.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable, and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions, or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for multi-facet conversational item search. For example, the elements illustrated in FIG. 1, FIG. 2, FIG. 3, FIG. 4 and FIG. 12, such as when encoded to perform the operations illustrated in FIG. 5, FIG. 6, FIG. 7, and FIG. 8, constitute exemplary means for receiving a single utterance of a user comprising a conversational search query including a plurality of words identifying an item and a plurality of search refinement terms associated with the item; extracting a plurality of facet-actions corresponding to the plurality of search refinement terms from the plurality of words, a facet comprising an item attribute, a facet-action comprising a set of filter actions corresponding to a corresponding item attribute of the item; identifying a plurality of multi-facet filters corresponding to the plurality of facet-actions; applying the plurality of multi-facet filters to a plurality of items in a catalog, the plurality of multi-facet filters corresponding to the plurality of facet-actions; identifying a plurality of candidate items from the plurality of items remaining after application of the plurality of multi-facet filters; generating a plurality of search relevance scores for the plurality of candidate items, a score in the plurality of search relevance scores indicating a degree of relevance of a candidate item relative to other candidate items in the plurality of candidate items; selecting a set of most relevant items from the plurality of candidate items that are responsive to the conversational search query based on the plurality of search relevance scores; and presenting a search result comprising the selected set of most relevant items to the user via a user interface.

Other non-limiting examples provide one or more computer storage devices having a first computer-executable instructions stored thereon for providing multi-facet conversational item search with improved search refinement. When executed by a computer, the computer performs operations including to obtain a single utterance of a user comprising a conversational search query, the conversational search query comprising a plurality of words identifying an item and a plurality of search refinement terms associated with the item; extract a plurality of facet-actions corresponding to the plurality of search refinement terms from the plurality of words, a facet comprising an item attribute, wherein a facet-action comprises a set of filter actions corresponding to the item attribute; apply a plurality of multi-facet filters to a plurality of items in a catalog, the plurality of multi-facet filters corresponding to the plurality of facet-actions; identify a plurality of candidate items from the plurality of items remaining after application of the plurality of multi-facet filters; score the plurality of candidate items using a set of scoring criteria; select a candidate item from the plurality of candidate items having a highest score; and generate a search result comprising the selected candidate item, wherein the search result is presented to the user via a user interface.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either" "one of" "only one of" or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for conversational item search using multi-facet actions, the system comprising:
- a processor; and
- a computer-readable medium storing instructions that are operative upon execution by the processor to:
  - obtain a single utterance of a user comprising a conversational search query, the conversational search query comprising a plurality of words identifying an item and a plurality of search refinement terms associated with the item;
  - convert the single utterance into a bidirectional sequence of tokens using a natural-language model comprising a set of stacked transformer encoder layers and a conditional random field (CRF) decoder, the bidirectional sequence of tokens representing the plurality of words;
  - extract, from the bidirectional sequence of tokens, a plurality of facet-actions, each facet-action comprising an entity corresponding to an item attribute, and entity-role identifying a semantic refinement value associated with the entity, and a mapped filter action selected from a set of filter operations including exact, exclude, greater-than, less-than, and range;
  - identify, based on the plurality of facet-actions, a corresponding plurality of multi-facet filters;
  - apply the plurality of multi-facet filters to a plurality of items in a catalog, the plurality of multi-facet filters removing items that are irrelevant to the conversational search query;
  - identify a plurality of candidate items from the plurality of items remaining after application of the plurality of multi-facet filters;
  - score the plurality of candidate items using scoring criteria comprising a semantic-similarity measure between the conversational search query and item-attribute data associated with each candidate item;
  - select a candidate item from the plurality of candidate items having a highest score; and
  - generate a search result comprising the selected candidate item, wherein the search result is presented to the user via a user interface.

2. The system of claim 1, wherein the instructions are further operative to:
- convert the single utterance into a bidirectional tokenized query string comprising a plurality of bidirectional tokens representing the plurality of words, wherein an extractor analyzes the plurality of bidirectional tokens to extract the plurality of facet-actions from the single utterance.

3. The system of claim 1, wherein the instructions are further operative to:
- identify the entity associated with an attribute of the item;
- recognize an entity role corresponding to the entity; and
- map the entity and the entity role to a set of actions, wherein a facet-action is associated with the entity, the entity role, and the set of actions mapped to the entity role.

4. The system of claim 1, wherein scoring the plurality of candidate items further comprises:
- generate two sub-scores associated with each candidate item, wherein the two sub-scores are weighted and summed to obtain a score for each candidate item.

5. The system of claim 1, wherein the instructions are further operative to:
- identify a first role associated with the entity and a second role associated with the entity;
- identify a first action associated with the entity and the first role; and
- identify a second action associated with the entity and the second role, wherein a first facet-action corresponds to the first action and a second facet-action corresponds to the second action.

6. The system of claim 1, wherein the instructions are further operative to:
- identify a price entity, wherein the price entity is associated with a first numeric value role and a second numeric value role, the first numeric value role being lower than the second numeric value role; and identify a first facet-action of greater than for the first numeric value role and a second facet-action of less than for the second numeric value role, wherein a first filter associated with the first facet-action and a second filter associated with the second facet-action are applied to remove items having a price that falls outside a specified price range.

7. The system of claim 1, wherein identifying the entity, recognizing the entity-role, and mapping the entity and the entity-role to the plurality of facet-actions is performed by a named-entity recognition model comprising the set of stacked transformer encoder layers and the conditional random field (CRF) decoder that jointly predicts entity labels and entity-role labels using a BILOU tagging scheme.

8. A method for conversational item search using multi-facet actions, the method comprising:

obtaining a single utterance of a user comprising a conversational search query, the conversational search query comprising a plurality of words identifying an item and a plurality of search refinement terms associated with the item;

converting the single utterance into a bidirectional sequence of tokens using a natural-language model comprising a set of stacked transformer encoder layers and a conditional random field (CRF) decoder, the bidirectional sequence of tokens representing the plurality of words;

extracting, from the bidirectional sequence of tokens, a plurality of facet-actions corresponding to the plurality of search refinement terms from the plurality of words, a facet comprising an item attribute, wherein a facet-action comprises a set of filter actions corresponding to the item attribute, each facet-action comprising an entity corresponding to the item attribute, an entity-role identifying a semantic refinement value associated with the entity, and a mapped filter action selected from a set of filter operations including exact, exclude, greater-than, less-than, and range;

identifying, based on the plurality of facet-actions, a corresponding plurality of multi-facet filters;

applying the plurality of multi-facet filters to a plurality of items in a catalog, the plurality of multi-facet filters corresponding to the plurality of facet-actions removing items that are irrelevant to the conversational search query;

identifying a plurality of candidate items from the plurality of items remaining after application of the plurality of multi-facet filters;

scoring the plurality of candidate items using a set of scoring criteria comprising a semantic-similarity measure between the conversational search query and item-attribute data associated with each candidate item;

selecting a candidate item from the plurality of candidate items having a highest score; and generating a search result comprising the selected candidate item, wherein the search result is presented to the user via a user interface.

9. The method of claim 8, wherein identifying the entity and the entity-role from the bidirectional sequence of tokens is performed by a named-entity recognition model comprising the set of stacked transformer encoder layers and the conditional random field (CRF) decoder that jointly predicts entity labels and entity-role labels using a BILOU tagging scheme.

10. The method of claim 8, wherein training of the natural-language model comprises optimizing a multi-task loss function including an entity-classification loss, an entity-role loss, and a masked-token prediction loss, a total loss being a sum of the entity-classification loss, the entity-role loss, and a mask-modeling loss.

11. The method of claim 10, wherein optimizing the masked-token prediction loss comprises masking 15% of tokens in each input sequence such that, for each selected token, 70% are replaced with a mask token, 10% are replaced with a random token, and 20% are left unchanged.

12. The method of claim 8, further comprising:

generating two sub-scores associated with each candidate item;

weighting the two sub-scores; and summing to obtain a score for each candidate item.

13. The method of claim 8, further comprising:

identifying a first role associated with the entity forming a first entity-role and a second role associated with the entity forming a second entity-role; and identifying a first action associated with the first entity-role and a second action associated with the second entity-role, wherein a first facet-action corresponds to the first action, and wherein a second facet-action corresponds to the second action.

14. The method of claim 8, wherein a facet-action in the plurality of facet-actions comprises at least one of a brand, price, rating, discount, color, material, and size associated with an item, and wherein a facet-action in the plurality of facet-actions comprises at least one of a greater than action, a less than action, a range action, an exclude action, and an exact match action.

15. One or more computer storage devices having computer-executable instructions stored thereon, which, upon execution by a computer, cause the computer to perform operations comprising:

obtaining a single utterance of a user comprising a conversational search query, the conversational search query comprising a plurality of words identifying an item and a plurality of search refinement terms associated with the item;

converting the single utterance into a bidirectional sequence of tokens using a natural-language model comprising a set of stacked transformer encoder layers and a conditional random field (CRF) decoder, the bidirectional sequence of tokens representing the plurality of words;

extracting, from the bidirectional sequence of tokens, a plurality of facet-actions corresponding to the plurality of search refinement terms from the plurality of words, a facet comprising an item attribute, wherein a facet-action comprises a set of filter actions corresponding to the item attribute, each facet-action comprising an entity corresponding to the item attribute, an entity-role identifying a semantic refinement value associated with the entity, and a mapped filter action selected from a set of filter operations including exact, exclude, greater-than, less-than, and range;

identifying, based on the plurality of facet-actions, a corresponding plurality of multi-facet filters;

applying the plurality of multi-facet filters to a plurality of items in a catalog, the plurality of multi-facet filters corresponding to the plurality of facet-actions removing items that are irrelevant to the conversational search query;

identifying a plurality of candidate items from the plurality of items remaining after application of the plurality of multi-facet filters;

scoring the plurality of candidate items using a set of scoring criteria comprising a semantic-similarity measure between the conversational search query and item-attribute data associated with each candidate item;

selecting a candidate item from the plurality of candidate items having a highest score; and generating a search result comprising the selected candidate item, wherein the search result is presented to the user via a user interface.

16. The one or more computer storage devices of claim 15, wherein the operations further comprise:

training a machine learning model using a set of customized training data to filter items based on multiple item attributes and multiple filter actions.

17. The one or more computer storage devices of claim 15, wherein the operations further comprise:

converting the single utterance into a bidirectional tokenized query string comprising a plurality of bidirectional tokens representing the plurality of words, wherein an extractor analyzes the plurality of bidirectional tokens to extract the plurality of facet-actions from the single utterance.

18. The one or more computer storage devices of claim 15, wherein the operations further comprise:

identifying the entity associated with an attribute of the item;

recognizing an entity role corresponding to the entity; and identifying a set of actions corresponding to the entity and the entity role, wherein the facet-action is associated with the entity, the entity role, and the set of actions mapped to the entity role.

19. The one or more computer storage devices of claim 15, wherein the operations further comprise:

generating two sub-scores associated with each candidate item, wherein the two sub-scores are weighted and summed to obtain a score for each candidate item.

20. The one or more computer storage devices of claim 15, wherein the operations further comprise:

generating a first facet-action corresponding to a first entity and first role associated with the first entity;

generating a second facet-action corresponding to the first entity and a second role associated with the first entity; and applying a first filter to a set of items, wherein the first filter corresponds to the first facet-action; and applying a second filter to the set of items, wherein the second filter corresponds to the second facet-action.

* * * * *